T. Sharr,
Steam-Boiler Indicator.
No. 48,730. Patented July 11, 1865.
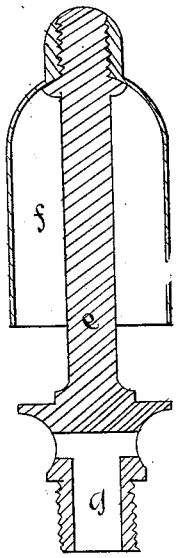
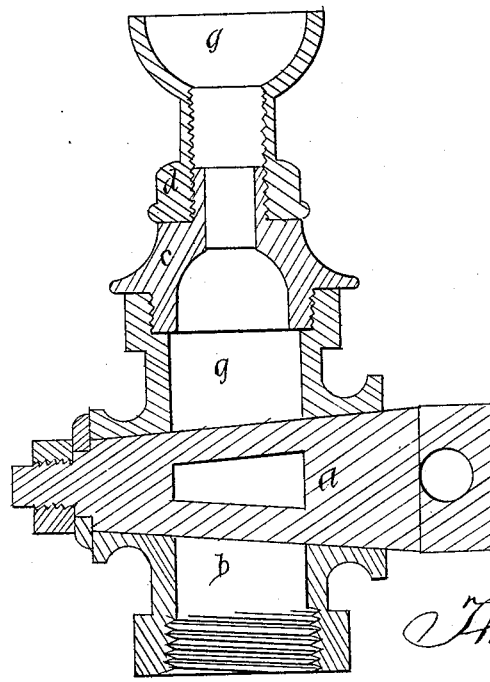
Witnesses:
Elias J. Shaw
E. Cobb
Inventor:
Thomas Shaw

UNITED STATES PATENT OFFICE.

THOMAS SHAW, OF PHILADELPHIA, PENNSYLVANIA.

IMPROVEMENT IN LOW-WATER SIGNALS.

Specification forming part of Letters Patent No. 48,730, dated July 11, 1865.

*To all whom it may concern:*

Be it known that I, THOMAS SHAW, of the city and county of Philadelphia, Pennsylvania, have invented a new and Improved Signal for Detecting when Water is Low in Steam-Boilers.

My invention consists in the employment of animal or vegetable substances that melt at 160° or 200° Fahrenheit, in combination with a chamber for retaining the same to withstand the pressure of the boiler, and to operate as hereinafter described.

In order to enable others to use and practice my invention, I will proceed to describe its construction and operation.

On reference to the accompanying drawing, which forms a part of the specification, the sketch represents a vertical section through the center of the apparatus with the upper part detached, for the purpose as hereinafter described.

Refering to the letters of reference, $a$ represents the plug or valve in an ordinary faucet, $b$, on the upper end of which is screwed cap $c$, on the top of which is screwed the bottom part of a whistle, $d$. $e$ is the stem of the whistle, supporting the bell part $f$. On the lower part of said stem $e$ is a male screw, which fits in the female screw of the lower part of the whistle $d$, thus forming a complete whistle when the passages are free, all for the purpose as hereinafter described.

The present drawn position of the apparatus represents it in a position to be filled with the animal or vegetable substance, which should be of such a consistency as to close the aperture $g$ (when at the ordinary temperature of the atmosphere) perfectly tight from pressure from below, and to melt at a temperature from 160° to 200°. Ordinary beeswax of itself, or in combination with rosin, is found to be a good material for the purpose.

The apparatus is put in operation in this wise: The plug $a$ is turned in the position shown, when the molten wax is poured in the top of passage $g$, after which the stem of the whistle $e$ is introduced and screwed into $d$, when the wax is allowed to cool, after which the apparatus is attached to the top of an iron pipe that terminates at the lowest water-line in the boiler. The plug $a$ is turned so that the passages $b$ and $g$ communicate, when the pressure in the boiler will be received and resisted by the wax $g$, and will continue to do so unless the water is evaporated below the terminus of the iron pipe to which the apparatus is attached, in which case the steam will replace the water in the tube, and the heat therefrom will melt and blow out the wax and cause an alarm by the whistle, thus fulfilling the object by attracting the attention of the engineer, who can repeat the operation of setting the apparatus.

What I claim, and desire to secure by Letters Patent, is—

The described apparatus, in combination with described animal or vegetable substance, when used for the purpose set forth.

THOMAS SHAW. [L. S.]

Witnesses:
ELIAS J. SHAW,
E. COBB.